Dec. 10, 1968  M. FRENZEL ET AL  3,415,444
OIL SEAL FOR ROTARY PISTON INTERNAL-COMBUSTION ENGINES
Filed Dec. 7, 1966

Inventors

Manfred FRENZEL, Herbert KIEBEL

By Spencer & Kaye

Attorneys

United States Patent Office 3,415,444
Patented Dec. 10, 1968

3,415,444
OIL SEAL FOR ROTARY PISTON INTERNAL-
COMBUSTION ENGINES
Manfred Frenzel and Herbert Kiebel, Burscheid, Germany, assignors to Goetzewerke Friedrich Goetze AG, Burscheid, Germany
Filed Dec. 7, 1966, Ser. No. 599,773
Claims priority, application Germany, Dec. 15, 1965, G 45,462
10 Claims. (Cl. 230—145)

ABSTRACT OF THE DISCLOSURE

A seal for rotary internal-combustion engines to seal off the gas chamber of the engine from the oil lubrication chamber. The seal includes at least one seal ring which has one surface in fluid-tight contact with the eccentric and another surface in fluid-tight contact with the piston.

Background of the invention

The present invention relates generally to the sealing art, and, more particularly, to a seal for rotary piston internal-combustion engines and which is provided between the piston and the eccentric of such an engine by means of self-tightening or self-clamping piston rings.

In rotary piston internal-combustion engines the lubricating agent or lubricant required for lubricating the piston which bears on the eccentric is frequently used at the same time as a cooling agent or coolant for the piston itself. In order to seal the lubricant and/or the coolant circulation, as the case may be, with respect to the combustion chamber, it is customary to provide annular sealing elements between the end faces of the piston and the lateral walls of the housing. Besides this, sealing strips are embedded at the piston edge into the lateral surfaces which maintain the gas pressure in the combustion chambers and partially free the lateral walls of the housing from the influence of the hot waste gases.

The annular oil seals or gaskets at the radially inner edge of the lateral piston surface comprise, for example, sealing rings, particularly slide rings which are pressed against the housing wall by spring action or elastic force. As a result of thermal influences of the internal-combustion engine, warping or distortions in the lateral walls will occur quite easily so that fault-free sealing is no longer guaranteed. In addition thereto, such sealing rings are subjected not only to a rotating sliding movement, but additionally also to a shearing movement which is due to the eccentric positioning of the piston. As a matter of course, this will lead to rapid wear and tear of the sealing rings.

In order to eliminate these disadvantages, it is already known (German DAS 1,187,854) to provide, within the inner housing space or chamber, at least one disk which rotates with the eccentric shaft and is essentially concentric to the axis of rotation of the piston, and which is in communication with one end piston wall by way of an annular seal.

It is also not new to provide an eccentric collar disposed next to the eccentric supporting the piston with a groove and to accommodate therein a slit outwardly clamping sealing ring. The latter rests sealingly against the piston in the radial direction and, due to the gas pressure acting thereon, is sealingly pressed with one flank against one groove wall in the axial direction. The pressure of the gas varies considerably, however, since it depends upon the perviousness of the end face seal or gasket between the piston and the housing. In order to eliminate too high a gas pressure within the chamber between the end face seal and the lubricant and/or the coolant seal, a relief or excess pressure valve is arranged therein so as to counteract an increased wear and tear of the sealing ring.

While this known sealing arrangement is simple with respect to the sealing element proper, any sealing action or effect of the sealing ring is absent if, in the most unfavorable of cases, the gas pressure becomes lower than the pressure of the lubricant and/or the coolant. Particularly when the engine stands still, there is no longer any sealing action.

Summary of the invention

With this in mind, it is a main object of the present invention to provide an improved seal or gasket which overcomes the above-mentioned disadvantages of the prior art.

Another object is to provide a seal between the piston and the eccentric of a rotary piston is an internal-combustion engine which has an adjustable minimum sealing pressure which is independent of the gas pressure so that there is a sufficient sealing effect even when the engine is still.

These objects and others ancillary thereto are accomplished in accordance with preferred embodiments of the invention wherein at least one piston ring is disposed against the piston in a sealing manner which is known per se, and it has one side surface pressed against a counter sealing surface of the eccentric by spring means. It is possible also to dispose the seal at a ledge at the end of the eccentric. The spring may then be supported on a counter ring which is rigidly connected with the piston and which presses the piston ring against the end face of the eccentric which is formed by the ledge. It is also possible, however, to arrange the seal in a groove in the outer eccentric surface. In such event it is advantageous for the spring to be supported on a further piston ring which rests with one side surface against one groove wall and presses the first piston ring against the other wall of the groove.

Although a specific or particular spring is not required for the seal, it is advantageous to use an axially acting undulated spring. Also, in order to increase the sealing effect between the outer surface of the piston ring and the inner piston surface, the surface of at least one piston ring is provided with a coating of a synthetic or plastic material. A particularly suitable material for this is a polytetrafluoroethylene for example, Teflon (trademark of the Du Pont Company).

The number of piston rings of which the seal is constructed is not of particular importance in the present invention. However, care should be taken that if only one piston ring is used as the sealing ring between the spring and the counter sealing surface, it has a gas- and fluid-tight joint. If, instead, several piston rings are used, at least two rings closely adjoining one another with their side surfaces, then the ring joints can be provided in the normal manner. In this event, however, the ring joints are preferably offset with respect to each other and the rings are secured against rotating with respect to each other by means of coupling pins.

It is also possible to use at least one piston ring having an increased tangential tension within the area of the joint ends. This provides an advantage in that when the piston speeds are very high, the joint ends of the ring will not be caused to lift off the cylindrical inner surface of the piston due to the inertia forces which temporarily act thereon and are directed toward the eccentric axis. This proper maintaining of the position of the ends of the piston ring can be accomplished also by using very large annular radial cross sections.

*Description of the preferred embodiments*

Figure 1:
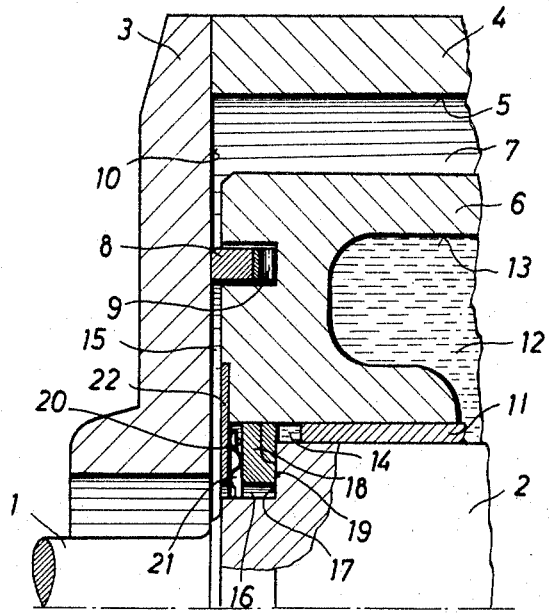
FIGURE 1 is a partial cross-sectional view through a rotary internal-combustion engine having an oil chamber seal with a single piston ring.

With more particular reference to the drawings, FIGURE 1 shows a shaft 1 having an eccentric 2. The shaft 1 is positioned in the side wall 3 of the engine housing formed by members 3, 4. A closure body 4 is disposed between the two side walls 3, of which only one is shown in the drawing for purposes of clarity. The inner surface 5 of the closure body 4 is the bearing surface for the triangular piston 6 and has the form of an epitrochoid (although this is not indicated in the drawings). The chamber formed by space 7 between the piston 6 and the housing 3, 4 is the combuston chamber of the engine. This chamber is sealed off with respect to the shaft and the bearing of the piston by means of sealing strips 8 which are held in constant contact with the lateral surface 10 of the housing wall 3, by means of spring 9. The piston 6 is rotatably disposed on the eccentric 2 by means of a friction or a sleeve bearing 11. The lubricant 12 is used for lubricating the friction bearing 11 and serves at the same time as a coolant for the inner piston walls 13.

A seal or gasket in accordance with the present invention is provided between the piston 6 and the eccentric 2 and seals off the fluid chamber 14 with respect to the gas chamber 15 between the piston 6 and the housing wall 3. For this purpose a ledge 16 is disposed at the edge of the eccentric 2. Piston ring 18 sealing engages in a gas-tight manner one side surface 19, which is known as the counter sealing surface, on the end face 17 of the eccentric. The force of an undulated spring 21 acts upon the oppositely positioned side surface 20 of the ring 18 and this spring is in turn supported on a counter ring 22 which is rigidly connected with the piston 6.

Figure 2:
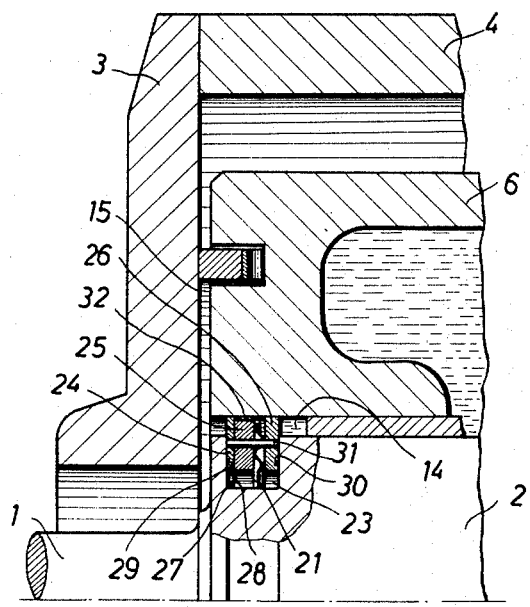
FIGURE 2 is a partial cross-sectional view through a rotary piston internal-combustion engine having an oil chamber seal which is constructed of several piston rings.

As shown in FIGURE 2 a different seal is mounted between the piston 6 and the eccentric 2. In this embodiment a groove 23 having a rectangular section is arranged in the eccentric 2 for receiving the sealing elements. The seal is constructed of a total of three piston rings 24, 25 and 26, and they together prevent the passage of the fluid 14 to the gas chamber 15 between the piston 6 and the housing 3, 4. Two piston rings 24 and 25 are offset with respect to each other about 180°, but their joints are positioned closely adjacent one another with one flank surface 27, 28 each and they are held in constant contact with the side groove surface 29 by the force of an undulated spring 21. Spring 21 is supported against the third piston ring 26 which is simultaneously pressed against the second side groove surface 30. All of the seal parts are secured against rotation by means of a connecting pin 31. A coating 32 of synthetic or plastic material is provided on the outer circumferential surface of the central piston ring 25.

The present invention provides a seal between the piston and the eccentric of a rotary piston internal-combustion engine which has a minimum sealing pressure which is adjustable and independent of the gas pressure so that complete separation between the fluid chamber and the gas chamber is provided even while the engine is standing still. Furthermore, in the seal as illustrated in FIGURE 2, the influence of the gas pressure is largely eliminated. At the same time there is the possibility that the two piston rings 24 and 25 will lift off the side groove surface 29 when there is an extremely high gas pressure.

The gas can then pass into the groove chamber 23 and escape into the cooling liquid circulation via the nongas-tight joint of the piston ring 26. An additional excess pressure release valve is thus rendered unnecessary.

Although the present invention has been illustrated for a rotary piston internal-combustion engine it is also applicable for similar sealing conditions in other structures.

It will be understood that the above description of the present invention is susceptible to various modifications, changes, and adaptations, and the same are intended to be comprehended within the meaning and range of equivalents of the appended claims.

We claim:

1. In a rotary piston internal-combustion engine having a piston and an eccentric, the improvement comprising a seal between the piston and the eccentric, said seal including at least one piston ring having its radially outer surface in sealing contact with the radially inner surface of such piston, the eccentric having a counter sealing surface, and spring means positively pressing one side surface of the piston ring against said counter sealing surface.

2. The improvement defined in claim 1 wherein the seal is disposed at a ledge near an end of the eccentric.

3. The improvement defined in claim 2 wherein a counter ring is rigidly connected to said piston, said spring means being supported by said counter ring and pressing the piston ring against the end face of the eccentric formed by the ledge.

4. The improvement defined in claim 1 wherein a groove including said counter sealing surface is provided in the radially outer surface of the ececntric, and said seal is disposed in said groove.

5. The improvement defined in claim 4 wherein there is a second piston ring which supports the spring means and has one side surface against one wall of the groove, with the spring means pressing the first mentioned piston ring against said counter sealing surface formed by the other groove wall.

6. The improvement defined in claim 1 wherein said spring means is an axially acting undulated spring.

7. The improvement defined in claim 1 wherein such piston ring is provided on its outer surface with a coating of synthetic material.

8. The improvement defined in claim 1 wherein the piston ring is arranged to provide a gas-tight and fluid-tight joint between the spring means and the counter sealing surface.

9. The improvement defined in claim 1 wherein there are several piston rings between the spring means and the counter sealing surface and they are offset with respect to each other, and coupling pins securing the rings against twisting.

10. The improvement defined in claim 8 wherein such piston ring has an increased tangential tension at the joint ends.

References Cited

UNITED STATES PATENTS

| 2,457,221 | 12/1948 | Girard | 230—147 |
| 3,249,094 | 5/1966 | Hoppner et al. | 123—8 |
| 3,323,713 | 6/1967 | Wenderoth et al. | 230—145 |

DONLEY J. STOCKING, *Primary Examiner.*

W. J. GOODLIN, *Assistant Examiner.*

U.S. Cl. X.R.

123—8